United States Patent [19]

Schierenbeck

[11] 4,325,326

[45] Apr. 20, 1982

[54] CAST GRATE, ESPECIALLY FOR PIG STABLES

[76] Inventor: Reinhard Schierenbeck, Böttcherei 171, 2803 Weyhe-Leeste, Fed. Rep. of Germany

[21] Appl. No.: 123,383

[22] Filed: Feb. 20, 1980

[30] Foreign Application Priority Data

Feb. 20, 1979 [DE] Fed. Rep. of Germany ....... 2906515

[51] Int. Cl.³ .............................................. A01K 1/01
[52] U.S. Cl. .................................................. 119/28
[58] Field of Search ...................... 119/28, 20; 404/36; 52/660, 656

[56] References Cited

U.S. PATENT DOCUMENTS

| | | | |
|---|---|---|---|
| 492,777 | 3/1893 | Buchanan, Jr. .......................... | 119/28 |
| 1,890,980 | 12/1932 | Ferris ...................................... | 119/28 |
| 3,905,334 | 9/1975 | Stevenson ........................... | 119/28 X |
| 4,018,188 | 4/1977 | Burdette ................................ | 119/28 |
| 4,183,324 | 1/1980 | Nobbe .................................... | 119/28 |

*Primary Examiner*—Hugh R. Chamblee
*Attorney, Agent, or Firm*—Charles Hieken

[57] ABSTRACT

Cast grates, especially for pig stables, have parallel bars with two slits between them and connecting end bars at their ends. Between these end bars are bridges displaced from bar to bar along a bridge curve, such as a sine wave or sawtooth wave. Tread surfaces on each bar have convex shoulders contiguous with concave flank surfaces at inflection points. All tangential planes of the flanks have a clear distance from the neighboring bar. The tread and bridge surfaces have a slope toward the slit between ½ and 1/16, and preferably about ⅛.

10 Claims, 5 Drawing Figures

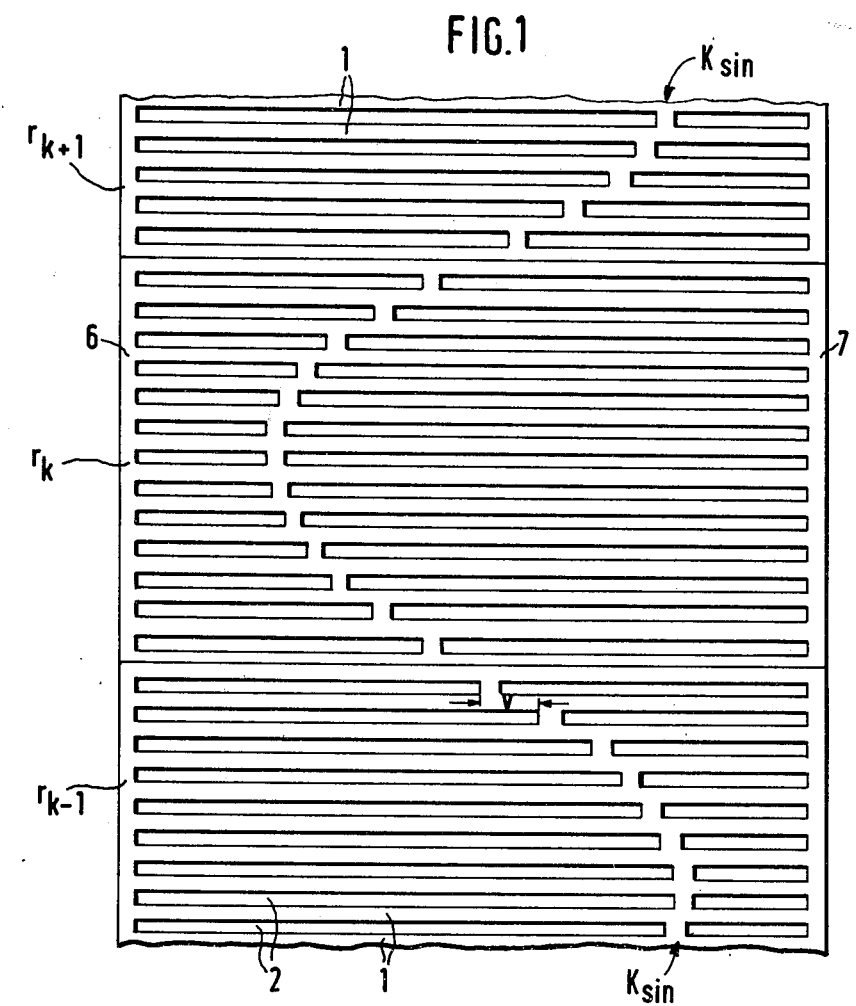

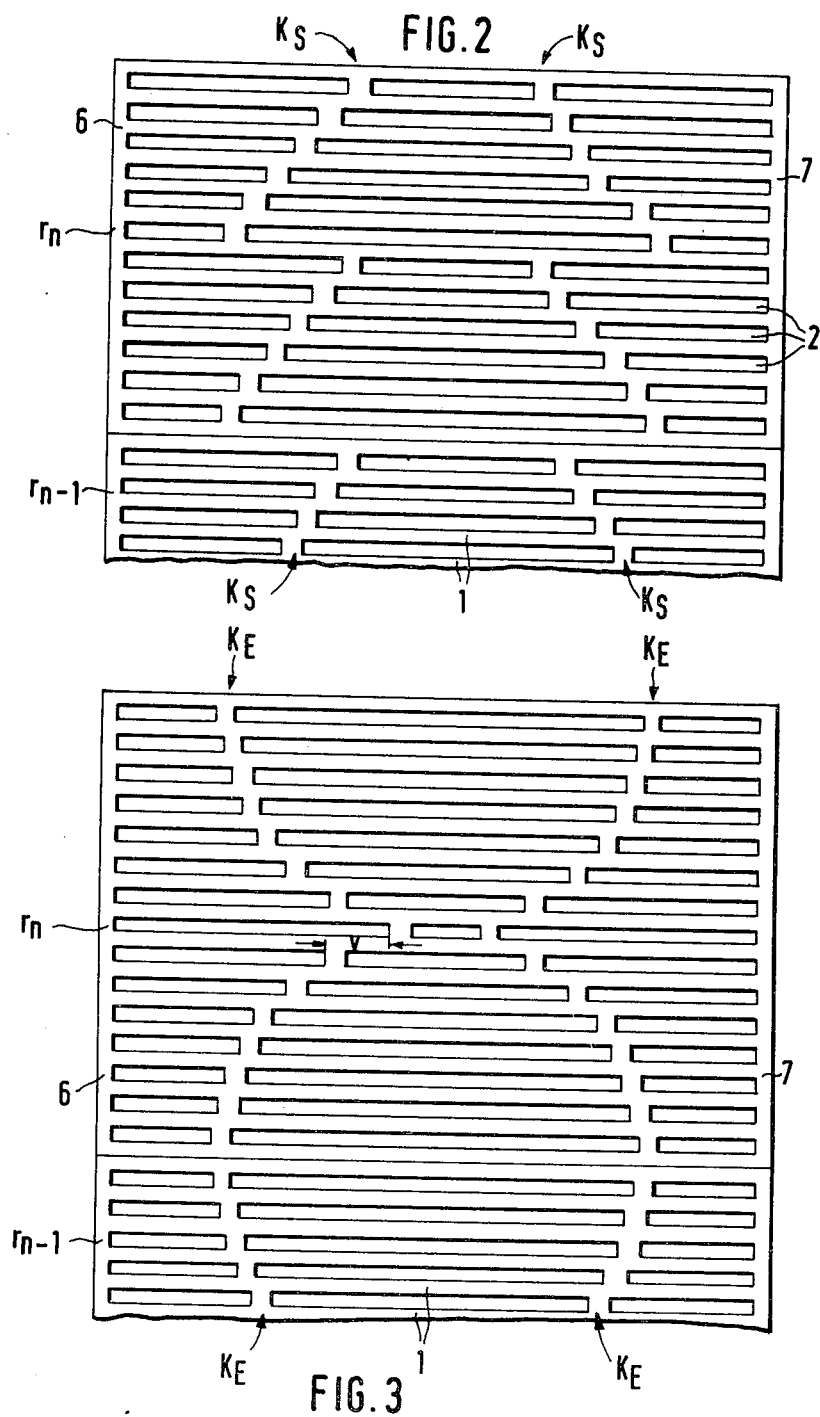

4,325,326

CAST GRATE, ESPECIALLY FOR PIG STABLES

FIELD OF THE INVENTION

The invention relates to a cast grate, especially for pig stables, consisting of parallel profile bars with connecting end bars and stabilizing bridges along one or more bridge lines running transversely to the bars.

BACKGROUND OF THE INVENTION

Cast grates of such construction, however, are unsatisfactory on account of uneven or irregular shapes, cracking and fragility.

OBJECT OF THE INVENTION

In cast grates hitherto known the bridges are arranged along straight bridge lines running rectangularly to the bars. It is already known to omit bridges alternately within parallel bridge lines across every second slit, in order to obtain a better self-cleaning of the grate.

SUMMARY OF THE INVENTION

When solving this problem the present invention starts from the observation of turbulent flow of material during the casting procedure at the crossings of bars and bridges. Such irregularities of flow are often followed by a lack of eveness of texture and undesired stress of material. Such symptoms will occur far more if a plurality of such crossings are arranged in a line, as mostly is the case in grates of known construction. Furthermore experiments have shown that undesired stress will occur much more at groups of bars of equal length compared to a group of bars of unequal lengths.

In order to ensure good results it is mostly important that irregularities of flow of material and stress of material which both are natural accompaniments of bridging zones, on the one hand shall not be enlarged by an aggregation of bridges within a rectangular line over many or over all bars of the grate and on the other hand such stresses should be neutralized by following bridges which are staggered in relation to the bridge to be neutralized by a not too large displacement in longitudinal direction of the bars.

Starting out from this idea the essential feature of the invention is to be seen in an arrangement of said bridges along bridge lines (bridge curves) running angularly to the direction which is perpendicular to the bars with the result of displacements of bridges across neighbouring slits.

The displacements or steps may follow wavy lines above the grate supports or end bars as abscissae and preferably following two bridge-curves running symmetrically about the middle line of the grate, as for instance, saw tooth-like or sinusoidal bridge-curves.

In order to guarantee a good neutralisation of stresses by bridges, said displacements of bridges within a bar-group should be less than nine times the width of a bar and preferably predominantly not more than twice the width of a bar. On the other side the displacements should preferably be more than one third of the width of a bar.

Not only high stability but also a high quality of surfaces is ensured by a bridge arrangement as outlined above. This is important to meet high requirements on good treads for the delicate clovens of little pigs. To meet these requirements it is furthermore advisable to form all the surfaces which may be touched by the clovens of the piglets that they give the best conditions for the movements of these animals. It has been found that optimal conditions can be reached if the tread surfaces of the bars have an incline or slope towards the grate slits of about $\frac{1}{2}$ to 1/16 and preferably of about $\frac{1}{8}$. Such incline ensures an optimal adaptation to the form and resiliency of the clovens when stretching over the grate with its bars and slits. However, this is true only under the condition that uneveness resulting from unfavorable bridge arrangements are avoided as outlined above. The clovens of little pigs also enter the slits of the grate and regularly will stretch along the flanks of the bars. It has been proved to ensure a good support also within the slits that according to the invention the upper tread surface passes over convex upper shoulders into concave flanks of the bars and that in such a manner that all the tangential planes to said flanks have a clear distance from the neighbouring bar.

DESCRIPTION OF EMBODIMENTS

The above and other objects, features and advantages of the present invention will become more readily apparent from the following description, reference being made to the accompanying drawing, in which:

FIG. 1 is a top view of a cast grate with a sinusoidal bridge-curve,

FIG. 2 is a top view of a cast grate with saw-tooth-like bridge-curves,

FIG. 3 is a top view of a cast grate with ellipse-like bridge-curves,

Figure 4:
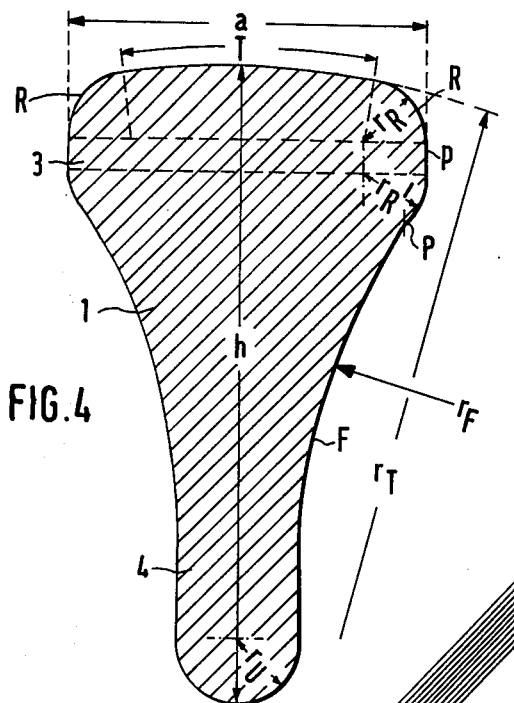
FIG. 4 is a sectional view through one of the grate bars.

The cast grates shown in the drawing broadly consists of parallel bars 1 with two slits between them and connecting end bars or supports 6,7 at their ends. Between their supports 6,7 the bars 1 are connected by one or more bridges 5 in order to obtain the desired stability and even shape. Bars 1 as well as bridges 5 have a T-like profile.

The bridges 5 are not arranged in equal distances from the supports 6,7 but are relatively displaced from bar to bar in such a manner that they form continuous or discontinuous bridge-curves over the supports 6,7 as abscissae.

FIG. 1 is showing displacements V forming a sinusoidal bridge curve $K_{sin}$, FIG. 2 displacements forming two saw tooth-like bridge curves $K_S$ and FIG. 3 displacements forming two elliptical or half-elliptical bridge curves $K_E$, both bridge curves $K_S$ and $K_E$ running symmetrically to the middle line of the grate.

The grate may consist of a lot of sectors each including a given number of, for instance, thirteen bars 1.

The top sides of the bars form the thread surface T for the clovens of the pigs or piglets. The tread surfaces pass over into convex shoulders R of the head-part 3 of the T-profile whereas the convex surfaces of said shoulders at turning or inflection points or turning lines P pass over into concave flank surfaces F of the foot- or ridge-part 4 of the T-profile. Said surfaces T, R and P together with the underside U form a continuous flowing-off surface for the secretions of the pigs and for the cleaning water.

All tangential planes of said flanks F have a clear distance from the neighbouring bar so that it is possible to reach any point at flanks F by water jets B of a thickness d. Boundary condition for cleaning by a water jet is that the turning point P may be reached by a jet S being tangent to the shoulder R of the neighbouring bar.

The thread surfaces T of the bars 1 as well as the bridges 5 have an incline towards the grate slits 2. As experiments have shown this incline should be between ½ and 1/16 and preferably about ⅛ in connection with a clear width b for the grate slits 2 of about 8 to 12 mm. An incline more than ½ would give no good security against slip whereas an incline less than 1/16 would give no good accomodation to or for the clovens of the piglets. It is desirable to adapt the incline to the ratio a/b and t/s. Of course, on the one hand it will be desirable to utilize a part as large as possible of the width "a" for forming the tread surface T. On the other hand shoulders R should have a radius of curvature large enough to avoid hurts of the clovens of the piglets and of the teats of the sow and to guarantee a good support to the clovens of the piglets when stretching along the bars and slits. The change from the convex curvature of the shoulders to the concave curvature of the flanks is important not only to give a good support for the clovens when entering more deeply the slits but is as well good for a selfcleaning by a quick loosening of dirt and especially dirt lumps passing the slit.

Figure 5:
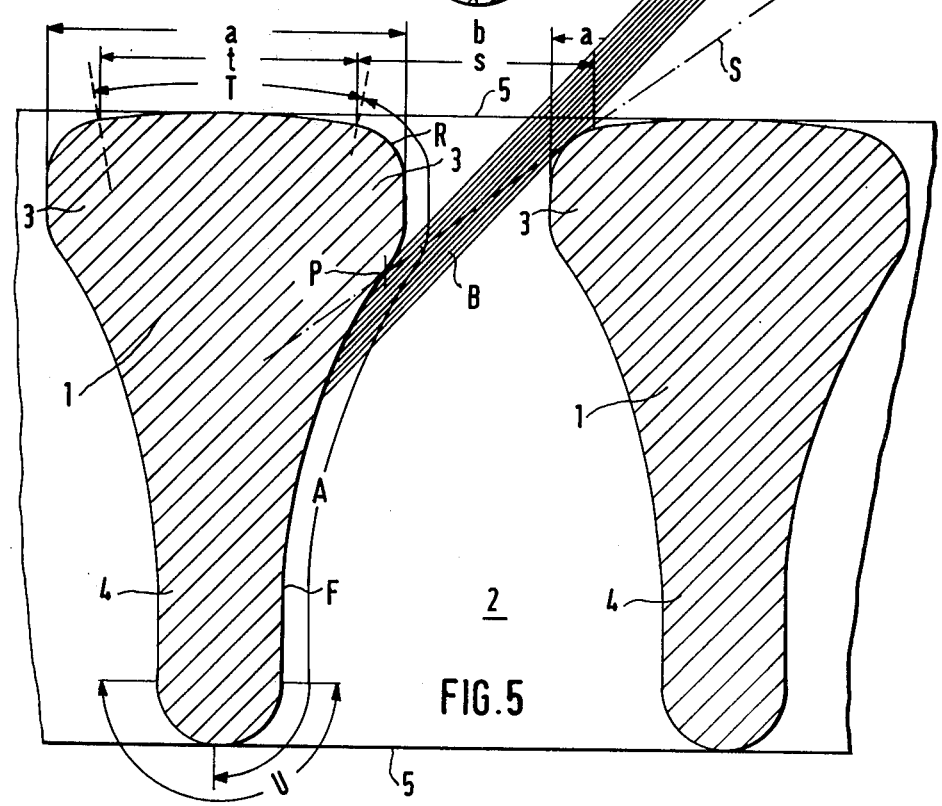
FIG. 5 is a sectional view through two neighbouring bars and through a cleaning jet of water.

The following dimensions have proved profitable in connection with stable boxes for piglets, as are illustrated in FIGS. 4 and 5:

a = 11.5 mm b = 9 mm

T = 8.2 mm $r_R$ = 2 mm $r_{R'}$ = 2 mm p = 1 mm $r_F$ = 20 mm $r_T$ = 30 mm h = 20 mm $r_U$ = 2 mm

For fullgrown pigs alone the ratio a/b could be a = 25 to 35 mm and b = 15 to 20 mm.

Many alterations are possible within the scope of the invention. Thus, more or less deviations from the preferred measurements may be admitted. As to the displacement of bridges it is preferred to avoid a large displacement of bridges followed by two or more bridges without or with small displacements.

Furthermore it is important that at least three neighbouring bars are connected by bridges to form a stable bar combination and that in each of such bar groups the above given maximum values of displacements are observed. In bar combinations of more than three bars it may be allowed that several bridges follow a straight line rectangular to three of those bars.

| LIST OF REFERENCES | | |
|---|---|---|
| 1 | Roststab, Stab | grate bar, bar |
| 2 | Spalt | slit |
| 3 | Stabkopf, Kopf | head of bar 1 |
| 4 | Stabsteg, Steg | foot or ridge of bar 1 |
| 5 | Brucke | bridge |
| 6,7 | Auflager | supports |
| a | Stabbreite | width of bar or bridge |
| A | Ablaufflache | flow surface |
| b | lichte Spaltweite | clear width of slit 2 |
| B | Wasserstrahlbundel | water jet |
| F | Stegflanke | flanks of bar or bridge |
| h | Stabhohe | height of bar |
| P | Kopfflanke | flank of head 3 |
| P | Wendepunkt, Wendegerade | turning point, turning line |
| R | Rand, Randflache | shoulder, surface of shoulder |
| $r_R$ | Radius der Randabrundungen | upper radius of shoulder |
| $r_{R'}$ | oberer Radius des Randes R | lower radius of shoulder |
| $r_U$ | unterer Radius des Randes R | radius of underside |
| s | Trittflachenlucke, effektive Spaltbreite | interval between tread surfaces |
| S | Grenzstrahl | ray, limit jet |
| t | Trittflachenbreite | width of T |
| T | Trittflache | tread surface |
| U | Stegunterseite, Stabunterseite | underside of 1 |

I claim:

1. Cast grate, especially for pig stables, consisting of parallel profile bars having tread surfaces with connecting end bars and stabilizing bridges along one or more bridge lines running transversely to the bars bridging the slit between adjacent bars, having the improvement comprising,
    said bridges along bridge curves running angularly to the direction which is perpendicular to the bars with the result of displacements in a direction parallel to said bars of bridges across neighbouring slits with the width a of each bar within the range of substantially 11.5 mm to substantially 35 mm and the width b of each slit within the range of substantially 9 mm to 20 mm,
    said bridge displacements being predominantly within the range of one third to twice the bar width a,
    said tread surfaces and bridges having an incline towards the grate slits of about ⅛ to 1/16 with convex upper shoulders contiguous with concave flanks for supporting the hoofs of little pigs.

2. Grate as defined in claim 1, wherein the bridge displacements follow wavy lines.

3. Grate as defined in claim 2, characterized by said bridge curves being saw-tooth-like.

4. Grate as defined in claim 2, characterized by said bridge curves being essentially sinusoidal.

5. Grate as defined in one of the claims 2 to 4, characterized by two of said bridge-curves running symmetrically about the middle line of the grate.

6. Grate as defined in one of the claims 1 to 4, wherein the bridge displacements are less than nine times the width of a bar.

7. Grate as defined in one of claims 1 to 4, characterized by a clear width of grate slit of about 8 to 12 mm and width of a bar of about 10 to 16 mm.

8. Grate as defined in one of claims 1 to 4, wherein the tread surfaces of the bars as well as the bridges have an incline towards the grate slits of about ⅛.

9. Grate as defined in claim 8, wherein all the tangential planes of said flanks have a clear distance from the neighbouring bar.

10. Grate as defined in claim 1 wherein the ratio of the width of a bar to the width of a slit adjacent to a bar (a/b) is within the range of substantially 1.25–2.33 wherein a and b are within the ranges of 25 mm to 35 mm and 15 mm to 20 mm respectively.

* * * * *